March 5, 1957　　　B. D. EISNER ET AL　　　2,783,697
PHOTO-COPY MACHINE
Filed Dec. 28, 1953　　　　　　　　4 Sheets-Sheet 1
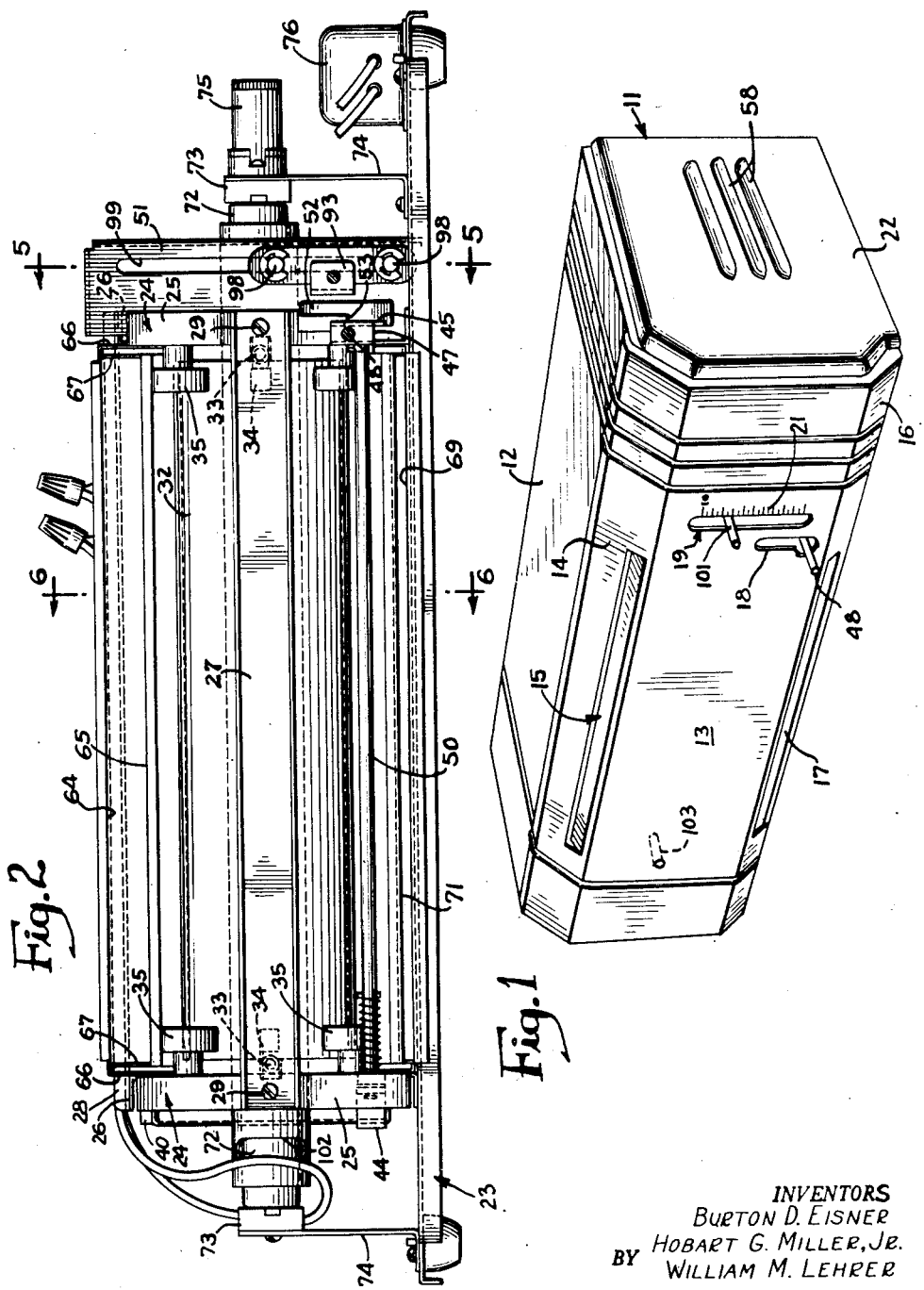
INVENTORS
BURTON D. EISNER
HOBART G. MILLER, JR.
BY　WILLIAM M. LEHRER March 5, 1957

B. D. EISNER ET AL 2,783,697

PHOTO-COPY MACHINE

Filed Dec. 28, 1953

INVENTORS
BURTON D. EISNER
HOBART G. MILLER, JR.
WILLIAM M. LEHRER
BY

March 5, 1957  B. D. EISNER ET AL  2,783,697
PHOTO-COPY MACHINE
Filed Dec. 28, 1953  4 Sheets-Sheet 3

INVENTORS
BURTON D. EISNER
BY HOBART G. MILLER, JR.
WILLIAM M. LEHRER
Atty

March 5, 1957  B. D. EISNER ET AL  2,783,697
PHOTO-COPY MACHINE
Filed Dec. 28, 1953  4 Sheets-Sheet 4

INVENTORS
BURTON D. EISNER
HOBART G. MILLER, JR.
WILLIAM M. LEHRER
by: Atty.

United States Patent Office 2,783,697
Patented Mar. 5, 1957

2,783,697

PHOTO-COPY MACHINE

Burton D. Eisner, Hobart G. Miller, Jr., and William M. Lehrer, Chicago, Ill., assignors, by mesne assignments, to American Photocopy Equipment Company, Chicago, Ill., a corporation of Illinois Application December 28, 1953, Serial No. 400,420

3 Claims. (Cl. 95—77.5)

The invention relates to improvements in photo-copy machines and more specifically to the novel construction and assembly of a portable power-operated apparatus, designed for office use, for making photo-copies of original sheets.

The machine embodying the features of the present invention is housed within a suitable casing having a feed slot through which an original sheet to be copied and a light-sensitive sheet are inserted into the machine and an exit slot through which the sheets are discharged after exposure within the machine. A manually operable on-off control lever for the operating mechanism projects from the machine casing. Also projecting from the casing is a manually operable shutter control lever for regulating the intensity of the light provided for the exposure of the light-sensitive sheet. The apparatus within the casing includes a transparent or translucent light transmitting cylinder arranged to have selective surface contact with a resiliently yieldable roller. The resiliently yieldable roller is power operated and is carried in a cradle movable to position said roller into and out of surface contact with the cylinder. Movement of the cradle, upon manipulation of the on-off control lever, controls operation of the means for driving the roller and also controls an on-off switch in the electrical circuit of the source of illumination provided for exposure of the light-sensitive sheet. The sheets entering the feed slot are drawn between the cylinder and roller and the rays of light from the source of illumination pass through the cylinder onto the sheets.

It is an object of the present invention to provide a novel, ruggedly constructed, self-contained, unitary photo-copy machine which is extremely easy to use and very efficient in operation.

Another object of the invention is to provide, in a photo-copy machine, a novelly constructed cradle movable manually into positions to carry a driven roller into and out of frictional surface contact with a freely rotatable cylinder.

Another object is to provide, in a photo-copy machine, novel means to lock a roller-carrying cradle in a predetermined position during machine operation.

Another object is to provide a photo-copy machine with novel shutter mechanism for regulating the intensity of light played upon a light sensitive sheet passing through the machine.

Another object of the invention is to provide novel means to adjust the light shutter in a photo-copy machine.

Another object is to provide a photo-copy machine of the character having a set of contact rollers between which sheets are drawn, with novel mounting means for one of the rollers, thus enabling said one roller to rotate freely in response to the application thereon of pressure by the other of said rollers while the latter is being rotated positively.

Another object is to provide a photo-copy machine of the type described herein with novel means to control operation of an electric switch connected in the electrical circuit for the motor and source of illumination.

Another object is to provide, in a photo-copy machine, a novel resiliently yieldable roller.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a photo-copy machine embodying the features of the present invention.

Fig. 2 is a front elevational view of the photo-copy machine, showing the casing removed.

Figure 3:
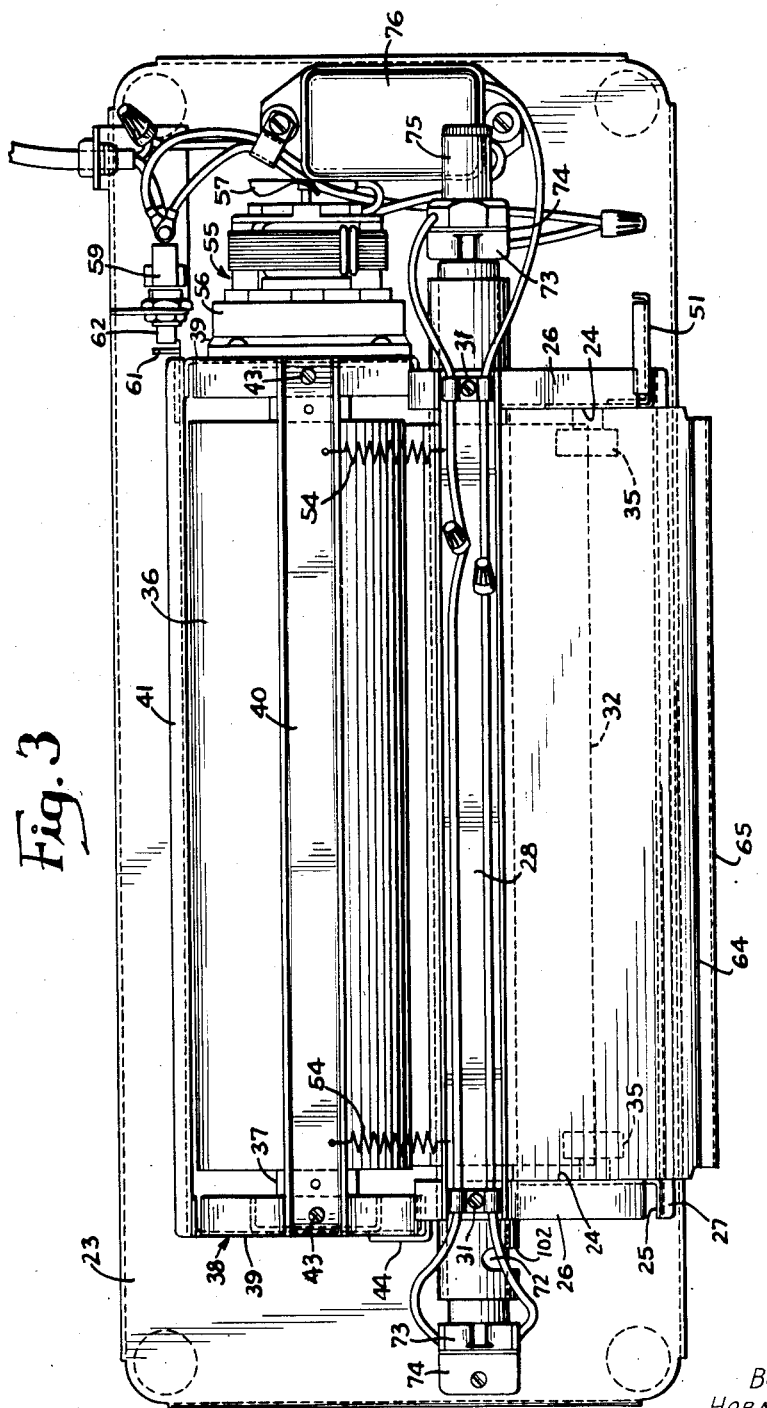
Fig. 3 is a top plan view of the machine with the casing removed.

Referring to the accompanying drawings and particularly to Fig. 1, the machine embodying the present invention is enclosed within a substantially rectangular sheet metal casing generally indicated at 11. The casing includes a top wall 12 and a front wall 13. The walls 12 and 13 are joined by an inclined wall portion 14 having a longitudinally extending slot 15 therein. As will become more apparent presently, the slot 15 constitutes an opening through which sheets of paper are fed into the machine. The front wall 13 terminates at its lower end in a downwardly inwardly inclined wall portion 16 having a longitudinal slot 17 therein in substantial vertical alignment with the slot 15. The slot 17 constitutes an exit opening through which the sheets of paper fed through the machine are ejected. The casing front wall 13 is also provided with a pair of vertical slots 18 and 19, the purpose of which will become apparent presently. It might be noted at this time, however, that a series of uniformly graduated markings 21 are provided on the front wall adjacent one edge of the slot 19 and that the other slot 18 has "off" and "on" markings suitably located adjacent opposite ends thereof.

The casing 11 also includes a back wall (not shown) and end walls 22 (only one shown) thus providing an inclosure open on its bottom side only. This casing is adapted to be positioned over the mechanism of the machine to enclose the same in cooperation with a mounting base generally indicated at 23 (Fig. 2).

All of the mechanism of the present apparatus is mounted upon the base 23. This base is also fabricated from sheet metal stock and it has a pair of end plates or standards 24 mounted firmly upon its top surface and extending perpendicular thereto upwardly. The standards 24 are, in the present disclosure, fabricated from flat sheet metal stock. Each standard is suitably provided on its front and top edges respectively with outwardly extending flanges 25 and 26. These flanges increase the rigidity of the standards and provide means for securing the ends of connecting channels 27 and 28 respectively, thereto. As is best illustrated in Fig. 2, the channel 27 bridges the standards 24 and is secured at its ends as by rivets or screws 29 to the flanges 25. The other channel 28 is disposed on top of the standards 24 and its ends are secured as by rivets or screws 31 to the standard flanges 26. The structure affords a very rigid frame-like assembly within which is mounted a roller constructed in the form of a transparent cylinder 32.

Figure 6:
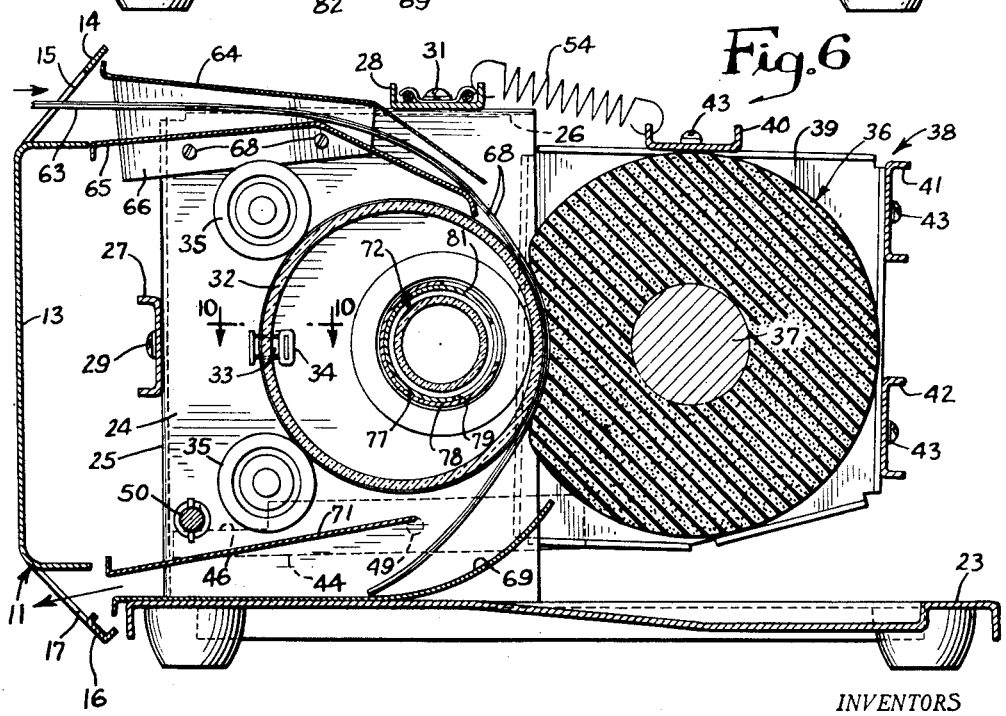
Fig. 6 is a vertical transverse sectional view taken substantially on line 6—6 of Fig. 2.
Figure 10:
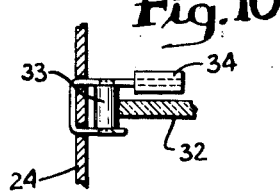
Fig. 10 is a sectional detail view taken on line 10—10 of Fig. 6.

The cylinder 32 is substantially co-extensive with the space between the standards 24 and, upon referring particularly to Figs. 6 and 10, it will be observed that each end of the cylinder is held spaced from the related standard by an anti-friction roller 33. Each roller 33 is carried in a bracket preferably formed of a strip of sheet metal stock bent substantially U-shaped to receive the roller journalled between the legs thereof. Obviously the brackets may be formed by striking the legs out of the body of the standards 24. One of the legs of each bracket (the one inside the cylinder 32) is substantially longer than the other leg, as is best illustrated in Fig. 10, and it receives thereover a pad or sleeve 34 of suitable resilient material such as rubber. Also associated with the cylinder 32, and constituting bearing means therefor, are two pairs of rolls 35. Upon referring to Fig. 5 it will be observed that a pair of said rolls is journalled on the inside face of each standard 24 and one roll of each pair is located below the anti-friction roller 33 and the other roll is located above said anti-friction roller. The two pairs of rolls 35 are adapted to co-act with the cylinder 32 and provide a rolling bearing surface for said cylinder when the machine is in operation. The specific manner in which this is obtained will be described presently. It might be noted however, at this time, that when the machine is not in operation (Fig. 5) the cylinder 32 is allowed to fall away from the uppermost roll 35 of each pair and is held from complete displacement by abutment against the sleeves 34 which constitute stops.

The cylinder 32 constitutes one of a pair of cooperating rollers between which sheets of paper fed into the machine are adapted to be drawn. The cooperating roller is indicated at 36. This roller 36 preferably is fabricated from vinyl plastic foam although it is obvious that it may be made of any suitable spongy or resiliently yieldable substance including, for example, sponge or foam rubber or plastic material. Vinyl plastic has been found to be most suitable for the use to which the roller is put because it is more resiliently yieldable and less subject to oxidation and surface flaking than foam rubber. The roller 36 is molded and cured on a shaft 37 journalled at its end in a movable carriage 38.

Figure 4:
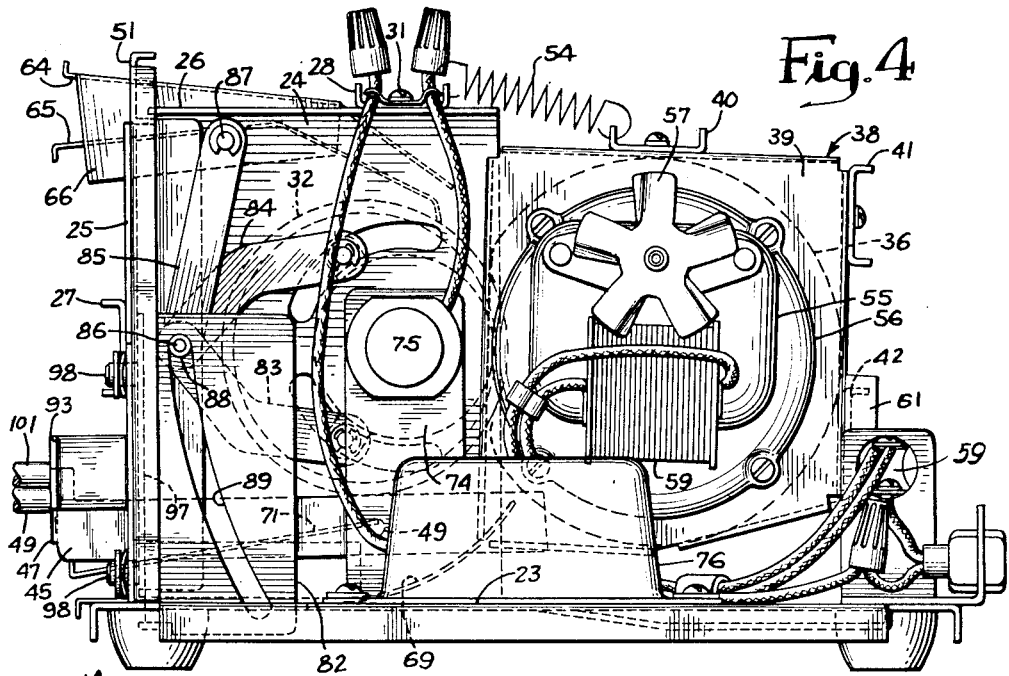
Fig. 4 is an elevational view of the right hand end of the machine (casing removed) as viewed in Fig. 2.
Figure 5:
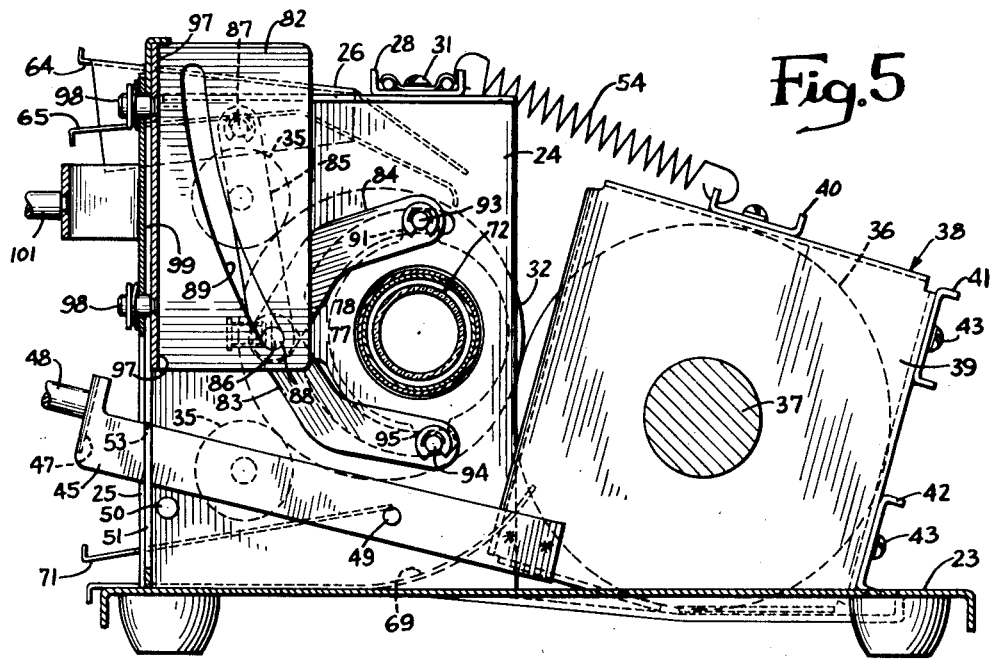
Fig. 5 is a vertical sectional view taken substantially on line 5—5 of Fig. 2.

The carriage 38 is movable from an inoperative position such as is illustrated in Fig. 5 into the operative position shown in Fig. 6. Before entering into a detail discussion of the operation and function of the roller 36, the structure and mounting of the carriage 38 will be described in detail. The carriage 38 includes a pair of end walls 39 flanged on all of its edges to impart rigidity thereto. The two end walls are connected rigidly by means of bridging channels 40, 41 and 42, which channels have their ends secured firmly to the related flanges of the end walls as by screws 43. The end walls 39 of the carriage 38 have secured firmly thereto, as by welding, closely adjacent to their bottom edges and extending forwardly across the outside face of the related standard 24, arms 44 and 45 respectively. The arm 44 at the left hand end of the machine, when the machine is viewed from the front as in Fig. 2, terminates short of the forward edge of the related standard 24 and is suitably offset to provide a shoulder 46 for a purpose to be explained presently. The other arm 45 (at the right hand end as viewed in Fig. 2) projects forwardly beyond the front plane of the related standard 24 and has its extreme forward end portion bent substantially at right angles thereto as at 47. The bent end portion 47 of the arm 45 is in register with the vertical slot 18 of the casing 11 when the latter is in place. Said portion also is tapped to receive an operating handle 48 which extends through and is movable in the vertical slot 18. Both of the arms 44 and 45 are pivotally secured midway of their lengths, as at 49, to the related standard 24 which pivotal mountings constitute the sole mounting for the carriage 38. It should be quite evident that the carriage is movable from the inoperative position illustrated in Fig. 5, into the cylinder contact position illustrated in Figs. 4 and 6. Movement of the carriage from one position to the other is accomplished by manual manipulation of the handle 48 projecting on the outside of the casing 11.

In order to lock the carriage in the elevated, machine operating position shown in Figs. 2 and 4 the operating handle 48 is moved downwardly in the slot 18. This movement of the operating handle 48 carries with it the arm 45 on which it is mounted. Upon referring to Fig. 2, it will be observed that the front flange 25 of the standard 24, associated with operating handle 48, has firmly secured to its flange 24 a vertical guide plate 51. This guide plate is welded or otherwise secured firmly in place and in fact constitutes a lateral extension of the flange 25. The guide plate 51 is formed with a slot 52 (Fig. 2) through which the forwardly projecting end of the arm 45 extends. The slot is offset outwardly of the normal plane of the arm 45 so as to retain said arm tensioned and is provided at its lower end with a widened area defining a horizontal shoulder 53. When the operating handle 48 is moved downwardly to carry the related arm 45 from the upper portion of the slot 52 into the lower portion of said slot, said arm snaps in a horizontal direction toward the standard 24 into a position to engage its top edge beneath the shoulder 53 thus locking said arm in its lowermost position. When the arm 45 snaps or springs into locking position it strikes one end of a spring-held rod 50 extending between the standards 24, and pushes said rod to the left so as to locate its other end over the shoulder 46 on arm 44. It is when the arms 44 and 45 are locked, that the carriage 38 is held in such position as to locate the resiliently yieldable roller 36 in frictional engagement with the cylinder 32. When this occurs, the cylinder 32 is moved toward the front of the machine away from the stop 34 and into full rolling contact with each roll 35 of the pairs of roll hereinabove referred to.

Inasmuch as the carriage 38 and accessory members carried thereon and which will be described presently are of considerable weight, means is provided to compensate for much of that weight so as to minimize the amount of effort required to press the handle 48 downwardly for raising the carriage into machine operation position. Such means may assume the form of tensioned springs 54, a pair of which are provided one adjacent each end of the machine and each having one end connected to the bridging channel 28 and its other end to the bridging channel 40 on the carriage.

The roller 36 is power driven and when said roller and cylinder 32 are in the position illustrated in Figs. 4 and 6, the roller 36 will drive the cylinder 32 through frictional surface engagement therewith, the latter being backed up against the pairs of rolls 35. It is desired that this machine be entirely automatic in its operation, consequently, means is provided in association with the carriage for operating the driving means for the roller 36.

The driving means consists of an electrically driven motor 55 of any accepted construction suitably connected to the roller shaft 37 through conventional gearing enclosed in a gear casing 56 mounted upon the right hand wall of the carriage as viewed in Figs. 3 and 4. The motor is of a type that is air cooled and is provided with a fan 57 effective to draw fresh air into the casing 11 through louvered openings 58 in one of the casing end walls 22. Inasmuch as the gearing within the gear casing 56 is conventional and constitutes no part of the present invention, said gearing is not shown in detail, it being sufficient to observe that it is a reduction gearing so as to impart a very slow rate of rotation of the roller 36. Electrical current from any suitable source is supplied to the motor 55 through suitable conduits having a depressible contact switch 59 connected therein. The switch is open normally, and is adapted to close only when the carriage has been raised into machine operating position. As best illustrated in Fig. 3, a cam plate 61 is mounted on the carriage 38 in close proximity to the depressible stem 62 of the switch 59 and is so disposed as to depress said stem and hold the switch closed when the carriage is moved into and held in its raised position. Thus it should be apparent that there is never any possibility of the motor continuing to operate, through oversight or inadvertence, after the carriage has been returned to its ineffective position.

As previously stated herein the machine is adapted to make photo-copies directly from an original although it may be used for other photo-copy or photographic work. In the present instance however, an original which is to be copied is placed in contact with the emulsion side of a sheet of light sensitive photographic paper. The two sheets, indicated at 63 in Fig. 6, are then inserted through the feed opening 15 in the casing 11. Immediately upon passing through the slot 15 the sheets enter an elongated funnel-shaped guide structure including top and bottom walls 64 and 65 defined by a pair of converging sheets of sheet metal. These walls 64 and 65 have overlapping end flanges 66 and 67 respectively, for providing a light-proof passageway through the funnel-shaped guide member. The flanges 66 on the upper wall 65 of said member are secured firmly, as by screws 68, to the related standards 24. The funnel-shaped guide member is inclined downwardly at its rear or innermost end and terminates a short distance above the initial contact surface of the roller 36 and cylinder 32. As a consequence, the pair of sheets 63 inserted through the funnel-shaped guide member are directed against the receiving side of the rotating roller and cylinder and are engaged therebetween.

Upon referring to Fig. 6, it will be observed that the sheets 63 tightly hug a segment of the circumference of the cylinder 32, within the area of contact by resiliently yieldable roller 36 which is distorted by said cylinder contact. As the sheets pass out from between the roller 36 and cylinder 32 they are guided by a plate 69 into an exit guide, one of the walls of which is formed by the plate 69 and the other by a wall 71. The plate and wall extend forwardly into close proximity with the exit opening 17 in casing 11. The sheets are therefore automatically directed toward and through the exit opening 17 and the projecting portions of said sheets may be grasped readily for withdrawing the sheets from the machine after the trailing edges have passed out from between the roller 36 and cylinder 32.

Exposure of the light sensitive sheet and consequent printing thereon of the subject matter of the sheet being copied occurs while the sheets 63 are being held firmly between the roller 36 and cylinder 32 during their passage therebetween. In order to effect exposure of the light sensitive sheet within this area, it is necessary to provide a source of illumination within a region in close proximity thereto and of the required intensity. Accordingly, a lamp tube 72 is mounted within the cylinder 32. This tube extends freely through openings provided in the supports 24 and has its usual pronged ends mounted in conventional sockets 73 carried on suitable brackets 74 extending upwardly from the base. The lamp tube is wired in a conventional manner, which wiring includes a starter switch 75 and a transformer 76, to a suitable source of electrical energy. In the present instance the same source of electrical energy is used for the lamp as is used for the motor and the lamp circuit includes the switch 59 previously described. In view of the arrangement, the lamp is energized only when the carriage 38 has been lifted into machine operating position and the current is supplied to the motor 55.

Figures 7, 8, 9:
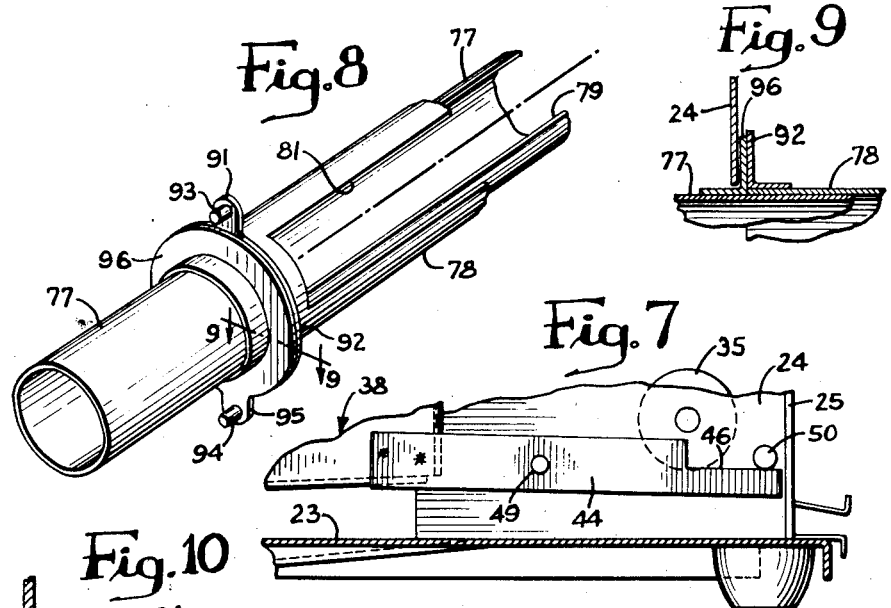
Fig. 7 is a fragmentary elevational view of the left hand end of the machine, the casing being omitted.
Fig. 8 is a fragmentary perspective view of the shutter tube assembly.
Fig. 9 is a sectional detail view taken on line 9—9 of Fig. 8.

In order to provide manually adjustable means for controlling the intensity of light directed onto the area of the sheets engaged between the roller 36 and cylinder 32, means is provided which is readily accessible to the operator for adjusting a novel shutter associated with the lamp tube. This shutter is perhaps best illustrated in Figs. 6, 8 and 9 wherein it will be observed that a pair of opaque sleeves 77 and 78 are telescoped one upon the other and over the lamp tube 72. The inner sleeve 77 is rotatably journalled in and extends through standards 24 a distance sufficient to cover the tube 72. The outer sleeve 78 terminates at the standards 24 and said sleeves are provided with longitudinal slots 79 and 81 respectively which slots are co-extensive one with the other and are disposed on the side facing the roller 36.

Means is provided for oscillatably rotating the shutter sleeves 77 and 78 in opposite directions simultaneously so as to increase or decrease the effective area of the opening defined by the slots 79 and 81. When in what might be termed a full "open" position, the slots 79 and 81 are in substantial register. By moving both shutter sleeves simultaneously and uniformly in opposite directions, the size of the light opening is progressively reduced uniformly on each side of the horizontal axis of the opening. This insures that the maximum light permitted to pass through the shutters is concentrated in a beam located on the horizontal axis.

The means provided for simultaneously rotating the shutter sleeves in opposite directions so as to accomplish the result noted in the preceding paragraph includes a cam plate 82 and a pair of associated links 83 and 84 (Figs. 4–5). The links 83 and 84 are pivotally connected together and to the lower end of a hanger link 85, as at 86. The upper end of the hanger link 85 is pivotally secured to the related standard 24 as at 87. The pivotal connection 86 includes a roller 88 disposed to ride in cam slot 89 in the cam plate 82. The link 84 has its other or free end pivotally connected to an ear 91 on an external flange 92 secured firmly to the outermost sleeve 78 by means of a pin 93. The other link 83 is similarly connected through a pin 94 to an ear 95 on an external flange 96 secured firmly to the inner shutter sleeve 77.

The cam plate 82 has a laterally bent portion 97 on its forwardly disposed edge which is suitably apertured to receive pins 98 firmly which extend through a vertical slot 99 in the guide plate 51 to mount an operating handle 101. The handle 101 is in alignment and extends forwardly through the vertical slot 19 in the casing 11. It should be quite apparent that when the handle 101 is moved upwardly or downwardly in the slot 19, the cam plate 82 is carried therewith. Such vertical movement of the cam plate 82 causes the roller 88 to travel along the cam slot 89 whereupon the hanger link 85 is moved about its pivot 87 forwardly or rearwardly to move the links 83 and 84 to impart rotation in opposite directions to the shutter sleeves 77 and 78. When the cam plate 82 is in its uppermost position, as illustrated in Fig. 5, the sleeves 77 and 78 are so positioned with respect to each other as to present the maximum opening through which light rays may pass. The cam plate 82 may, as previously noted, be moved downwardly from its extreme uppermost position into any selected position of adjustment. Such position may be determined readily by the uniformly graduated scale 21 adjacent one edge of the casing slot 19. As the cam plate is moved downwardly from the position as illustrated in Fig. 5, the light opening in the shutters is progressively moved into a more closed position.

Note should be taken of the fact that rotation of the shutter sleeves 77 and 78 in opposite directions is uniform; consequently, the longitudinal axis of the light opening, irrespective of its width, remains at all times in the same plate horizontally as the plane of the lamp tube axis. When the shutter opening approaches its narrowest dimensions, said dimensions become critical, and it is for this reason that the cam slot 89 is provided in the shape illustrated. It will be observed that when the cam plate is in its lowermost position (Fig. 4) and is then moved upwardly, movement of the links 83 and 84 is very slight; the rate of such movement however increasing as the lower portion of the cam slot 89 engages the roller 88. A light filter, to insure diffusion of the light passing through the cylinder 32 may be provided by spray coating said cylinder with a liquid gold solution or the like. This coating reduces the probability of the resiliently yieldable roller sticking to the cylinder and minimizes static electricity. Upon referring to Figs. 2 and 3 it will be observed that the inner tubular shutter 77 has a circumferential opening 102 near its left-hand end. This slot is in alignment with a clear plastic rod 103 (Fig. 1) in the casing front wall 13, which rod is illuminated when the lamp is "on" so as to provide a visual indicator.

From the foregoing, it should be obvious that the machine is substantially automatic in operation. The only functions which are manually performed are those of elevating the carriage 38 thus starting the motor and illuminating the lamp tube and then adjusting the shutters to provide the required light intensity.

The processing of a sheet having the material on one face only which is to be copied has been referred to hereinabove. The machine is also capable of operating to provide copies of either or both sides of a sheet. In the event a sheet to be copied carries material on both faces, the side to be copied is placed face down on a sheet of light sensitive paper. The two sheets are then inserted in the feed slot 15 in the same manner as described hereinabove and when processed are ejected through the exit opening 17. Upon ejection of the original and the exposed light sensitive sheet, said sheets are peeled apart and the exposed sheet is processed in any approved manner.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. A photo-copy printer comprising, in combination, a base, spaced standards on said base, a light transmitting cylinder extending between said standards, a light source within said cylinder, a pair of rolls mounted on each standard for rolling engagement by the end margins of the light transmitting cylinder, a carriage mounted for tilting movement above said base, a resiliently yieldable roller journalled in said carriage, said roller being substantially co-extensive with the light transmitting cylinder and movable into and out of frictional surface engagement therewith upon movement of the carriage, an electrically operated motor for rotating said resiliently yieldable roller, a normally open switch in the electrical circuit of said motor and light source, and means on the carriage to close said switch when the resiliently yieldable roller moves into contact with the light transmitting cylinder.

2. A photo-copy printer of the character recited in claim 1 in which the light transmitting cylinder rests out of contact with one roll of each pair of rolls when the resiliently yieldable roller is out of contact with the light transmitting cylinder.

3. In a photo-copy printer, a tubular lamp connected with a current source, a pair of sleeves telescoped over said tubular lamp, said sleeves being rotatable, each of said sleeves having a longitudinal slot substantially co-extensive with the lamp, said slots registering one with the other when the sleeves are in one position and in partial register when the sleeves are in other positions of adjustment, and means to rotate said sleeves in opposite directions to vary the effective width of the opening defined by said slots, said means including a manually adjustable cam plate common to both sleeves, the adjustable cam plate having its cam surface graduated to cause a progressive increase in the rate of relative rotation of the sleeves as they approach full slot-open position.

References Cited in the file of this patent

UNITED STATES PATENTS

| | | |
|---|---|---|
| 607,648 | Schwarz | July 19, 1898 |
| 1,500,372 | Cossitt | July 8, 1924 |
| 1,744,323 | Mayer | Jan. 21, 1930 |
| 2,041,478 | Niederle | May 19, 1936 |
| 2,419,836 | Holbrook | Apr. 29, 1947 |
| 2,641,980 | Brunk | June 16, 1953 |
| 2,743,653 | Kennedy | May 1, 1956 |